(12) United States Patent
Harding et al.

(10) Patent No.: US 12,465,724 B2
(45) Date of Patent: Nov. 11, 2025

(54) PROBE DELIVERY DEVICE TO FACILITATE THE ADVANCEMENT AND RETRACTION OF A PROBE WITHIN AN INTRAVENOUS CATHETER

(71) Applicant: Becton, Dickinson and Company, Franklin Lakes, NJ (US)

(72) Inventors: Weston F. Harding, Lehi, UT (US); Jonathan Karl Burkholz, Salt Lake City, UT (US); Curtis H. Blanchard, Riverton, UT (US); Megan Scherich, Salt Lake City, UT (US); Yiping Ma, Layton, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 185 days.

(21) Appl. No.: 17/195,356

(22) Filed: Mar. 8, 2021

(65) Prior Publication Data

US 2021/0290905 A1 Sep. 23, 2021

Related U.S. Application Data

(60) Provisional application No. 62/993,421, filed on Mar. 23, 2020.

(51) Int. Cl.
*A61M 25/01* (2006.01)
*A61M 25/00* (2006.01)
(Continued)

(52) U.S. Cl.
CPC .... *A61M 25/0113* (2013.01); *A61M 25/0133* (2013.01); *A61M 25/0606* (2013.01)

(58) Field of Classification Search
CPC .......... A61M 25/0113; A61M 25/0133; A61M 25/0606; A61M 2025/0019;
(Continued)

(56) References Cited

U.S. PATENT DOCUMENTS 3,835,854 A * 9/1974 Jewett ................ A61M 25/0113
604/159
9,186,100 B2 11/2015 Devgon
(Continued)

FOREIGN PATENT DOCUMENTS

CN 102099075 A 6/2011
CN 108525102 A 9/2018
(Continued)

*Primary Examiner* — Chelsea E Stinson
*Assistant Examiner* — Hamza A Darb
(74) *Attorney, Agent, or Firm* — The Webb Law Firm (57) ABSTRACT

A probe delivery device can include a probe delivery mechanism that facilitates advancing a probe through an IV catheter. The probe delivery mechanism can be housed within a compartment of the probe delivery device and can include a probe that extends from the compartment into a fluid pathway formed within the probe delivery device. A portion of the probe delivery mechanism can extend out from the housing to enable a clinician to advance and retract the probe. The probe delivery device may include a vacuum tube receiver or a connector to enable a blood draw or fluid injection to be performed using the probe delivery device.

18 Claims, 8 Drawing Sheets

(51) Int. Cl.
*A61M 25/06* (2006.01)
*A61M 25/09* (2006.01)

(58) Field of Classification Search
CPC ............ A61M 25/09041; A61M 25/00; A61M 25/0021; A61M 25/0043; A61M 25/0067; A61M 25/0082; A61M 25/0084; A61M 25/0905

See application file for complete search history.

(56) References Cited

U.S. PATENT DOCUMENTS

| | | | |
|---|---|---|---|
| 9,744,344 B1 | 8/2017 | Devgon et al. | |
| 9,750,446 B2 | 9/2017 | Devgon | |
| 10,064,576 B2 | 9/2018 | Devgon | |
| 10,076,272 B2 | 9/2018 | Devgon et al. | |
| 10,143,411 B2 | 12/2018 | Cabot | |
| 10,300,247 B2 | 5/2019 | Devgon et al. | |
| 2006/0015068 A1* | 1/2006 | Amisar | A61M 25/0637 604/164.01 |
| 2010/0094310 A1* | 4/2010 | Warring | A61M 25/0631 606/108 |
| 2010/0168834 A1 | 7/2010 | Ryan et al. | |
| 2011/0071502 A1* | 3/2011 | Asai | A61M 25/0606 604/528 |
| 2012/0184896 A1* | 7/2012 | DeLegge | A61M 25/0147 604/528 |
| 2012/0197200 A1 | 8/2012 | Belson | |
| 2012/0323181 A1* | 12/2012 | Shaw | A61B 17/3415 604/164.12 |
| 2014/0276948 A1 | 9/2014 | Zirps | |
| 2015/0202414 A1* | 7/2015 | Hwang | A61B 5/150389 600/585 |
| 2016/0074184 A1* | 3/2016 | Cummins | A61F 2/966 623/1.11 |
| 2017/0296792 A1* | 10/2017 | Ornelas Vargas | A61M 25/065 |
| 2018/0272106 A1* | 9/2018 | Funk | A61M 25/0113 |
| 2018/0333560 A1 | 11/2018 | Milner | |
| 2019/0038301 A1 | 2/2019 | Algawi et al. | |
| 2019/0321590 A1* | 10/2019 | Burkholz | A61M 5/14 |
| 2019/0321595 A1 | 10/2019 | Spataro et al. | |

FOREIGN PATENT DOCUMENTS

| | | |
|---|---|---|
| CN | 109640833 A | 4/2019 |
| CN | 215741218 U | 2/2022 |
| EP | 2799021 B1 | 11/2016 |
| JP | 2017526476 A | 9/2017 |
| WO | 03084428 A2 | 10/2003 |
| WO | 2008005618 A2 | 1/2008 |
| WO | 2012099908 A2 | 7/2012 |
| WO | 2017184535 A1 | 10/2017 |
| WO | 2018157339 A1 | 9/2018 |
| WO | 2019203997 A2 | 10/2019 |
| WO | 2019204701 A1 | 10/2019 |

* cited by examiner

PROBE DELIVERY DEVICE TO FACILITATE THE ADVANCEMENT AND RETRACTION OF A PROBE WITHIN AN INTRAVENOUS CATHETER

RELATED APPLICATIONS

This application claims the benefit of U.S. Provisional Patent Application No. 62/993,421, filed on Mar. 23, 2020, entitled "PROBE DELIVERY DEVICE FOR FACILITATING THE ADVANCEMENT AND RETRACTION OF A PROBE WITHIN AN INTRAVENOUS CATHETER," which is incorporated herein in its entirety.

BACKGROUND

Intravenous (IV) catheter devices are commonly used for a variety of infusion therapies. For example, an IV catheter device may be used for infusing fluids, such as normal saline solution, various medicaments, and total parenteral nutrition, into a patient. IV catheter devices may also be used for withdrawing blood from the patient.

A common type of IV catheter device is an over-the-needle peripheral intravenous ("IV") catheter ("PIVC"). As its name implies, the over-the-needle catheter may be mounted over a needle having a sharp distal tip. The catheter and the needle may be assembled so that the distal tip of the needle extends beyond the distal tip of the catheter with the bevel of the needle facing up away from skin of the patient. The catheter and needle are generally inserted at a shallow angle through the skin into the vasculature of the patient.

IV catheter devices typically provide an access port by which other devices may obtain access to the catheter while the catheter is positioned in a patient's vasculature. These other devices may be employed to perform various tasks such as obtaining a blood sample, injecting a fluid, performing a measurement, monitoring, etc. In many instances, the catheter of an IV catheter device may become occluded (e.g., due to a thrombus or fibrin sheath) which may prevent the performance of such tasks. If the catheter has become occluded, a clinician may attempt to remove the occlusion such as by inserting a needle, wire or other structure through the catheter. However, removing an occlusion using currently available techniques is not always effective, is oftentimes difficult to perform and may cause trauma to the vein.

The subject matter claimed herein is not limited to embodiments that solve any disadvantages or that operate only in environments such as those described above. Rather, this background is only provided to illustrate one example technology area where some implementations described herein may be practiced.

SUMMARY

The present disclosure relates generally to probe delivery devices for facilitating the advancement and retraction of a probe within an IV catheter. A probe delivery device can include a probe delivery mechanism that facilitates advancing a probe through an IV catheter. The probe delivery mechanism can be housed within a compartment of the probe delivery device and can include a probe that extends from the compartment into a fluid pathway formed within the probe delivery device. A portion of the probe delivery mechanism can extend out from the housing to enable a clinician to advance and retract the probe. The probe delivery device may include a vacuum tube receiver or a connector to enable a blood draw or fluid injection to be performed using the probe delivery device.

In some embodiments, a probe delivery device may include a housing having a proximal end and a distal end. The housing may form a compartment and a fluid pathway that extends to the distal end of the housing. The probe delivery device may also include a probe delivery mechanism housed in the compartment. The probe delivery mechanism may include a probe that extends from the compartment and into the fluid pathway. The probe delivery mechanism may be configured to advance the probe through the distal end of the housing and to retract the probe.

In some embodiments, the fluid pathway may extend from the proximal end of the housing to the distal end of the housing. In some embodiments, the housing may form a probe channel that extends from the compartment to the fluid pathway. In some embodiments, the probe delivery device may include a seal that isolates the probe channel from the fluid pathway. The probe may extend through this seal in some embodiments.

In some embodiments, the probe delivery mechanism may include a spool and an advancement wheel. In some embodiments, the advancement wheel may extend out from the housing, and when the advancement wheel is rotated, the spool may rotate to thereby cause the probe to advance or retract. In some embodiments, the probe may be wound around a spool drum of the spool.

In some embodiments, the probe delivery mechanism may include a spool around which the probe is wound, and the spool may form an advancement wheel that extends out from the housing. In some embodiments, the probe delivery mechanism may further include a primary wheel that is positioned proximal to the spool. The probe may extend proximally from the spool, wrap around the primary wheel and then extend into the fluid pathway. In some embodiments, the probe delivery mechanism may further include one or more secondary wheels that are adjacent to the primary wheel with the probe passing between and contacting the primary wheel and the one or more secondary wheels.

In some embodiments, the probe delivery mechanism may include a first guide wheel and a second guide wheel with the probe passing between and contacting the first guide wheel and the second guide wheel. In some embodiments, the probe delivery mechanism may further include an advancement wheel that extends out from the housing. When the advancement wheel is rotated, the first guide wheel may rotate to cause the probe to be advanced or retracted.

In some embodiments, the probe delivery mechanism may include a rack mechanism and a pinion. In some embodiments, the probe delivery mechanism may include an advancement wheel and a shaft. In some embodiments, the probe delivery mechanism may include a sliding member having an actuator portion that extends out from the housing and a wheel around which the probe is routed.

In some embodiments, a probe delivery device may include a housing having a proximal end and a distal end. The housing may form a compartment and a fluid pathway that extends from the proximal end to the distal end. The probe delivery device may also include a probe delivery mechanism housed in the compartment. The probe delivery mechanism may include a spool around which a probe is wound such that rotation of the spool causes the probe to be advanced or retracted. In some embodiments, the spool may extend out from the housing. In some embodiments, the probe delivery mechanism may include an advancement wheel that extends out from the housing and the spool may be rotated by the advancement wheel. In some embodiments, the probe delivery mechanism may include a primary wheel that is positioned proximal to the spool with the probe being routed around the primary wheel. In some embodiments, the spool may be a pinion. In some embodiments, the proximal end of the housing may form a vacuum tube receiver that is connected to the fluid pathway or a connector that is connected to the fluid pathway.

In some embodiments, a probe delivery device may include a housing having a proximal end and a distal end. The housing may form a compartment, a fluid pathway that extends from the proximal end to the distal end and a probe channel that is isolated from the fluid pathway. The probe delivery device may also include a probe delivery mechanism housed in the compartment. The probe delivery mechanism may include a probe that extends through the probe channel and into the fluid pathway. The probe delivery mechanism may be configured to advance the probe through the distal end of the housing and to retract the probe. In some embodiments, the probe delivery mechanism may extend out from the compartment.

It is to be understood that both the foregoing general description and the following detailed description are examples and explanatory and are not restrictive of the invention, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL VIEWS OF THE DRAWINGS

Example embodiments will be described and explained with additional specificity and detail through the use of the accompanying drawings in which.

DESCRIPTION OF EMBODIMENTS

In the specification and the claims, the term "IV catheter device" should be construed as any device that includes an IV catheter. The term "probe delivery device" should be construed as any device that is configured to advance and retract a probe within an IV catheter. In some embodiments, a probe delivery device may be a separate device from an IV catheter device with which the probe delivery device may be used. In other embodiments, a probe delivery device may be in the form of an IV catheter device. In other words, a probe delivery device may include an IV catheter in some embodiments. The term "probe delivery mechanism" will be used to represent a variety of mechanisms and/or configurations of a probe delivery device that enable a probe to be advanced and retracted within an IV catheter in accordance with embodiments of the present disclosure.

Prior to describing various examples of a probe delivery device, general characteristics of some embodiments of a probe delivery device will be described. A probe delivery device includes a distal end, which will be oriented towards the patient's vasculature during use, and a proximal end opposite the distal end. In some embodiments, the distal end may be configured to connect to an IV catheter device, while in other embodiments, the distal end may include an IV catheter. In some embodiments, the proximal end may be configured to allow a separate device to be connected to the probe delivery device. For example, the proximal end may include an access port or a vacuum tube receiver that form part of a fluid pathway that extends to the distal end of the probe delivery device. In other embodiments, the distal end or another portion of the probe delivery device may be configured to allow a separate device to be connected to the probe delivery device. However, in some embodiments, the probe delivery device may not be configured to enable a separate device to be connected to the probe delivery device. For example, a probe delivery device may be configured to deliver a probe while not being configured for injecting fluid or withdrawing blood.

Figure 1:
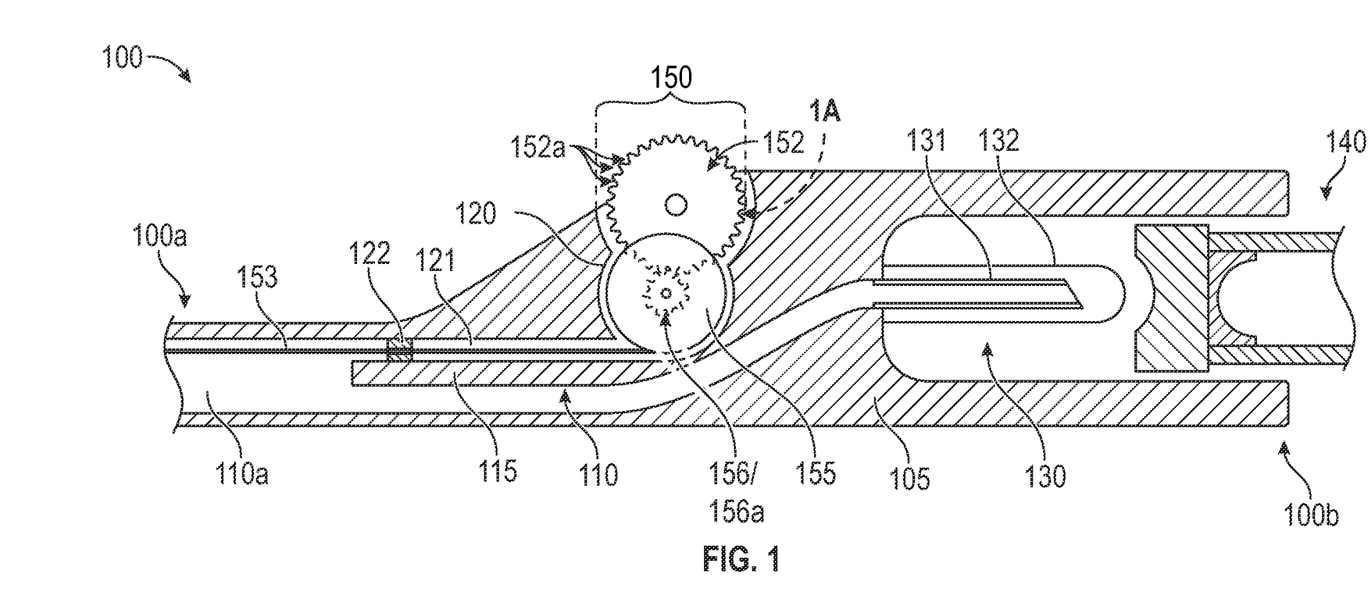
FIG. 1 is a cross-sectional side view of a device that is configured in accordance with some embodiments.

FIG. 1 illustrates an example of a probe delivery device 100 that is configured in accordance with some embodiments of the present disclosure. Probe delivery device 100 includes a housing 105 having a distal end 100a and a proximal end 100b. Although only a portion of distal end 100a is shown, as noted above, distal end 100a could include any type of connector to enable probe delivery device 100 to be connected to an IV catheter device or could incorporate an IV catheter. Proximal end 100b is configured to form a vacuum tube receiver 130 having a needle 131 covered by a protective sheath 132. A fluid pathway 110 extends within probe delivery device 100 from needle 131 to distal end 100a. Accordingly, when a vacuum tube 140 is inserted into vacuum tube receiver 130, a blood sample can be collected through fluid pathway 110. In other embodiments, proximal end 100b may include a Luer connector or any other type of connector that is coupled to fluid pathway 110.

Probe delivery device 100 includes a probe delivery mechanism 150 that enables a probe 153 (e.g., a nickel titanium wire) to be advanced in a distal direction through an IV catheter and subsequently withdrawn in a proximal direction. A compartment 120 is formed within probe delivery device 100 and houses probe delivery mechanism 150. A dividing wall 115 creates a probe channel 121 that extends distally from compartment 120 and joins fluid pathway 110 at a distal portion 110a of fluid pathway 110. To isolate compartment 120 from fluid pathway 110, a seal 122 (e.g., an elastomeric septum) may be positioned within and span probe channel 121. Probe 153 may extend through a slit or other opening formed within seal 122. Seal 122 may provide support to probe 153 to prevent it from buckling as it is advanced. Although probe channel 121 is shown as being substantially wider than probe 153, in some embodiments, the dimensions of at least a portion of probe channel 121 may be only slightly greater than probe 153 so that probe channel 121 may provide support to prevent buckling of probe 153.

Probe delivery mechanism 150 includes a spool 155 and an advancement wheel 152, both of which are configured to rotate within compartment 120. Spool 155 is positioned adjacent to advancement wheel 152 (i.e., towards probe channel 121 relative to advancement wheel 152). Advancement wheel 152 is positioned to extend partially out from compartment 120 to thereby enable a clinician to use his or her thumb or finger to rotate advancement wheel 152. Spool 155 includes a gear 156 having teeth 156a. Likewise, advancement wheel 152 includes teeth 152a and may therefore function as a gear. Teeth 152a interface with teeth 156a so that spool 155 is rotated when advancement wheel 152 is rotated. In the depicted embodiment, teeth 152a are formed along the outermost edge of advancement wheel 152. In other embodiments, however, teeth 152a may be formed along a portion of advancement wheel that is inset relative to the outermost edge.

Figure 1A:
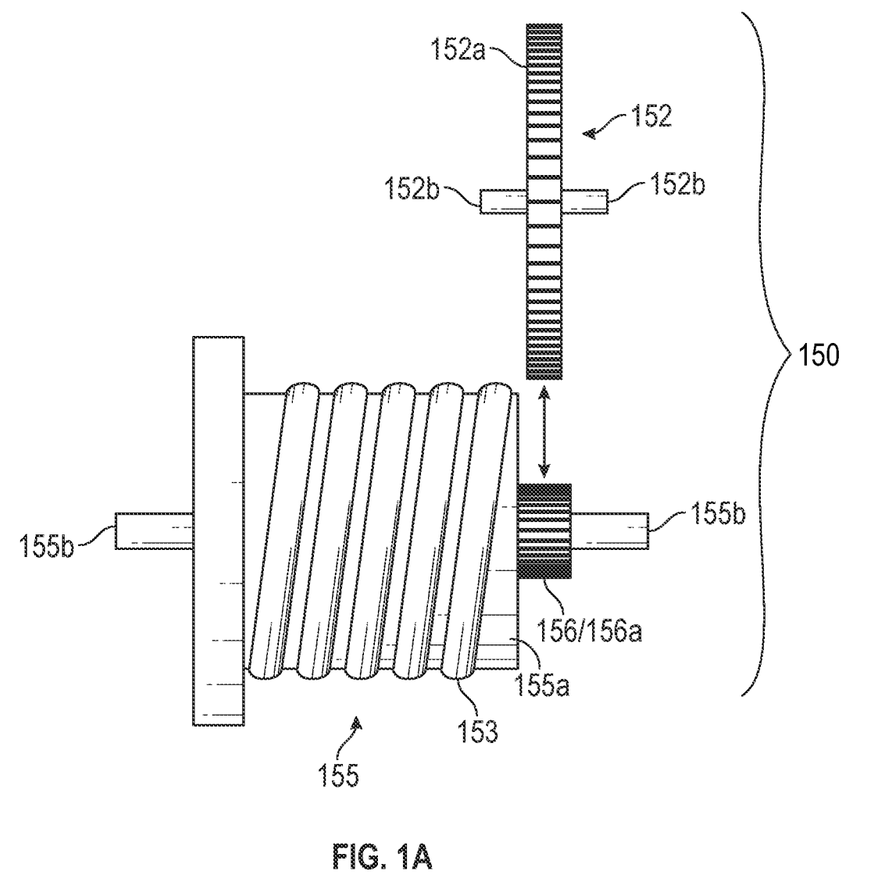
FIG. 1A is an exploded rear view of a probe advancement mechanism of the device of FIG. 1.

FIG. 1A provides an exploded rear view of probe delivery mechanism 150 in isolation. Spool 155 and advancement wheel 152 include axles 155b and 152b respectively by which these components are positioned within compartment 120 and around which these components rotate. Spool 155 includes a spool drum 155a around which probe 153 may be wound. Therefore, when spool 155 is rotated, the rotation may cause probe 153 to be advanced or retracted along probe channel 121 depending on the direction in which advancement wheel 152 is rotated. In the depicted embodiment, the gear formed by advancement wheel 152 has a larger diameter than gear 156 to thereby cause probe 153 to be advanced or retracted a larger distance relative to the amount of rotation of advancement wheel 152. In contrast, in other embodiments, the gear formed by advancement wheel 152 may have an equal or smaller diameter than gear 156. In such embodiments, probe 153 may advance or retract a smaller distance relative to the amount of rotation of advancement wheel 152 but such advancement or retraction may be accomplished with a reduced amount of force to advancement wheel 152.

In some embodiments, probe delivery device 100 may include a seal (not shown) within compartment 120 that isolates spool drum 155a and probe 153 from the external environment. In such embodiments, seal 122 may or may not be employed since fluid entering probe channel 121 would be prevented from escaping compartment 120 by the seal within compartment 120.

Figure 2:
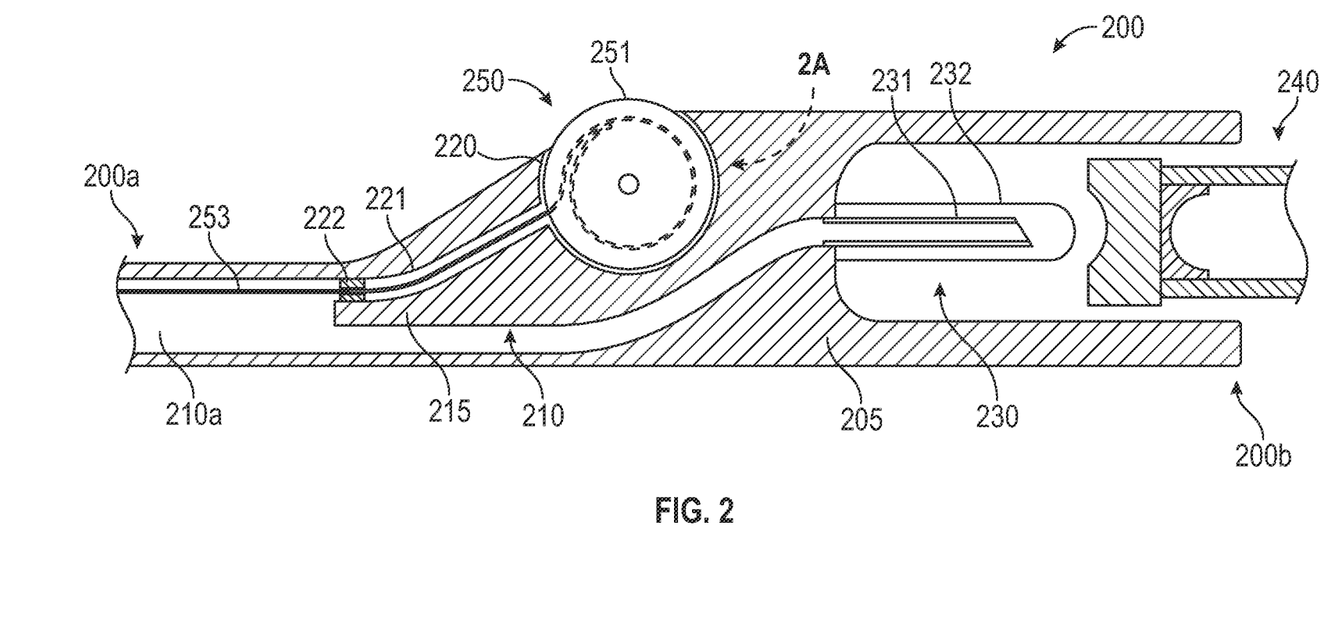
FIG. 2 is a cross-sectional side view of another device that is configured in accordance with some embodiments.

FIG. 2 illustrates another example of a probe delivery device 200 that is configured in accordance with some embodiments of the present disclosure. Probe delivery device 200 includes a housing 205 having a distal end 200a, which may be configured in any manner described above, and a proximal end 200b that forms a vacuum tube receiver 230 having a needle 231 covered by a protective sheath 232. A fluid pathway 210 extends within probe delivery device 200 from needle 231 to distal end 200a. Accordingly, when a vacuum tube 240 is inserted into vacuum tube receiver 230, a blood sample can be collected through fluid pathway 210. In other embodiments, proximal end 200b may include a Luer connector or any other type of connector that is coupled to fluid pathway 210.

In some embodiments, a length of the fluid pathway 210 be selected based on one or more of the following: a gauge of a particular IV catheter, a particular IV catheter assembly configuration, or a clinical setup. In some embodiments, the fluid pathway 210 may include a length L from a distal end of the needle 231 to the distal end 200a. In some embodiments, the fluid pathway 210 may include an inner diameter D.

Fluid flow in the fluid pathway 210 can be analyzed using Poiseuille's equation when the fluid pathway 210 is tubular:

$$Q = \frac{\pi D^4 \Delta P}{128 \mu L} = \frac{\Delta P}{R_f}$$

where $\Delta P$ is a change in pressure gradient across the length of the fluid pathway, D and L are the inner diameter and length, respectively, of the fluid pathway, $\mu$ is the viscosity of a fluid, and $$R_f = \frac{128 \mu L}{\pi D^4}$$

is the fluid resistance. Since $\mu$ is the viscosity of the fluid and not part of the extension tube geometry, a geometric factor $G_f$ is defined such that $R_f$ (the fluid resistance) is $$R_f = \frac{128 \mu L}{\pi} G_f,$$

where $$G_f = \frac{L}{D^4}.$$

In some embodiments, the fluid pathway 210 may have multiple sections with lengths (L1, L2, L3) and inner diameters of (D1, D2, D3), the geometric factor is then:

$$G_f = \frac{L1}{D1^4} + \frac{L2}{D2^4} + \frac{L3}{D3^4}$$

In some embodiments, the fluid pathway 210 may have an inner diameter that changes over the length of the fluid pathway 210, the geometric factor is then:

$$G_f = \int_0^L \frac{dl}{D(l)^4}$$

In some embodiments, the fluid pathway 210 may have a cross section that is not circular or may have a complicated inner diameter profile. The geometric factor can then be determined by measuring the flow rate (Q) at given pressure ($\Delta P$) with known viscosity ($\mu$) fluid:

$$G_f = \frac{\pi \Delta P}{128 \mu Q}$$

The $G_f$ value of the fluid pathway 210 may be selected to reduce the maximum shear stress for each IV catheter gauge to be the same or less than the max shear stress of a BD 21G VACUTAINER® UltraTouch™ push button blood collection set (available from Becton, Dickinson & Company of Franklin Lakes, New Jersey), which was previously considered the gold standard for blood draws. In some embodiments, $G_f$ value of the fluid pathway 210 may be selected to reduce the maximum shear stress for each catheter gauge to be the same or less than the max shear stress of a BD 25G VACUTAINER® UltraTouch™ push button blood collection set (available from Becton, Dickinson & Company of Franklin Lakes, New Jersey).

In some embodiments, a fluid pathway of a blood collection system, which may include one or more of the needle 231, the fluid pathway 210, and the IV catheter device (which may include one or more of a catheter adapter, an extension tube extending from a side port of the catheter adapter, and an IV catheter extending from a distal end of the catheter adapter), may include an entirety of a blood collection pathway through which blood flows after leaving the vasculature and into the vacuum tube 140 or other suitable blood collection device during blood collection. The system geometric factor $G_{fs}$ for the fluid pathway of the blood collection system can be determined in similar fashion as the $G_f$ value of the fluid pathway 210 as described earlier. In some embodiments, the system geometric factor $G_{fs}$ may be equal to or more than 7.34E+06 (1/in$^3$). In some embodiments, $G_{fs}$ may include another value. In some embodiments, the system geometric factor $G_{fs}$ may be equal to or more than 7.34E+06 (1/in$^3$) when the probe 253 is in the advanced position. In some embodiments, the system geometric factor $G_{fs}$ may be 7.34E+06 (1/in$^3$) plus or minus 10 percent, plus or minus 25 percent, plus or minus 50 percent, or plus or minus 75 percent. In some embodiments, $G_{fs}$ may include another value, which may be selected based on a gauge and/or length of the IV catheter.

Probe delivery device 200 includes a probe delivery mechanism 250 that enables a probe 253 to be advanced in a distal direction through an IV catheter and subsequently withdrawn in a proximal direction. A compartment 220 is formed within probe delivery device 200 and houses probe delivery mechanism 250. A dividing wall 215 creates a probe channel 221 that extends distally from compartment 220 and joins fluid pathway 210 at a distal portion 210a of fluid pathway 210. A seal 222 may be positioned within and span probe channel 221 to isolate probe channel 221 from fluid pathway 210.

Figure 2A:
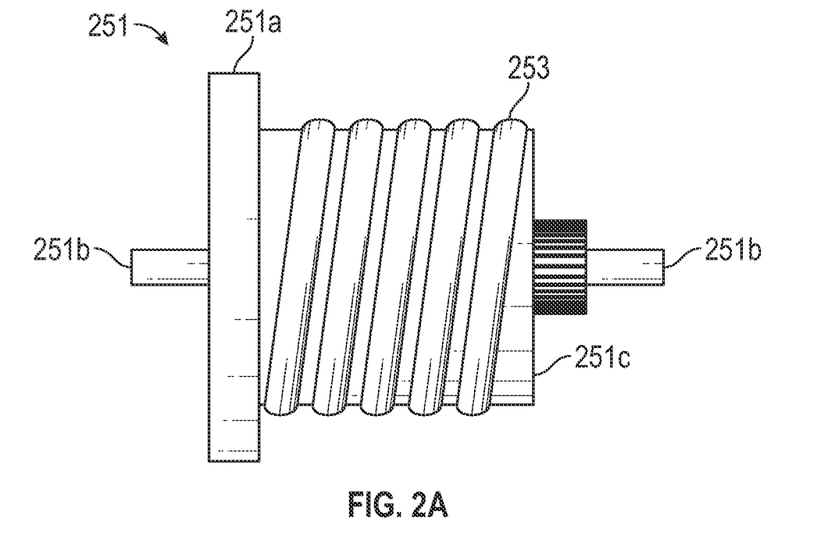
FIG. 2A is a rear view of a probe advancement mechanism of the device of FIG. 2.

As better shown in FIG. 2A, which is an isolated rear view of probe delivery mechanism 250, probe delivery mechanism 250 includes a spool 251 having an axle 251b that maintains spool 251 within compartment 220 and allows spool 251 to rotate. Spool 251 also includes a spool drum 251c around which probe 253 is wound. A portion of spool 251 forms an advancement wheel 251a that extends upwardly from compartment 220. Accordingly, a clinician can directly rotate spool 251 by applying a force to advancement wheel 251a. Such rotation can cause probe 253 to be advanced and retracted within probe channel 221 depending on the direction of rotation.

Figure 3:
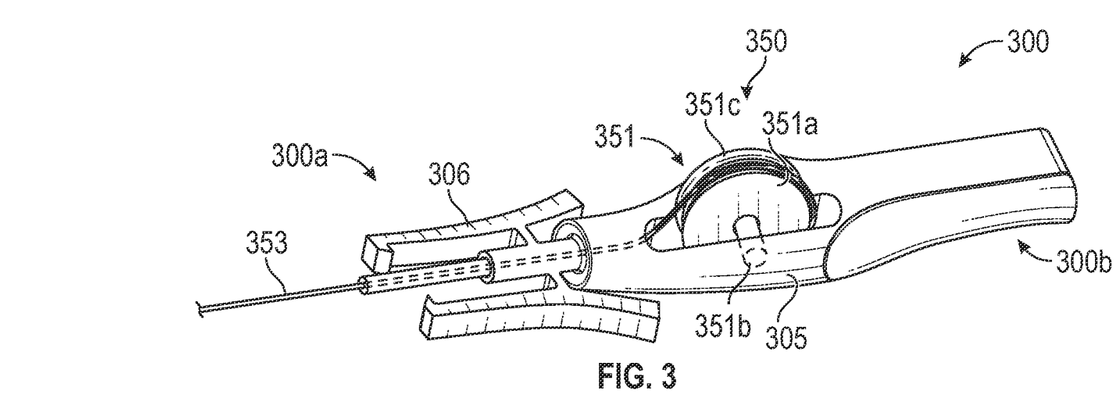
FIG. 3 is a top perspective view of another device that is configured in accordance with some embodiments.

FIG. 3 illustrates another example of a probe delivery device 300 that is configured in accordance with some embodiments of the present disclosure. Probe delivery device 300 includes a housing 305 having a distal end 300a and a proximal end 300b. Distal end 300a forms a connector 306 by which probe delivery device 300 may be coupled to an IV catheter device (not shown). Probe delivery device 300 is an example of a probe delivery device that is not configured to collect blood or inject fluid. Accordingly, proximal end 300b does not form a vacuum tube receiver or include an access port or other connector. Also, although not visible, a probe channel, but not a fluid pathway, may be formed within housing 305. Probe 353 may be extended through the probe channel, out through distal end 300a, into an IV catheter device to which probe delivery device 300 is connected and ultimately through the IV catheter. It is noted, however, that in some embodiments, proximal end 300b may be configured to allow blood to be collected or fluid to be injected using probe delivery device 300 (e.g., using any of the above-described techniques).

Probe delivery device 300 includes a probe delivery mechanism 350 having a spool 351 that is generally similar to spool 251. In particular, spool 351 has an axle 351b that maintains spool 351 within compartment 320 and allows spool 351 to rotate. Spool 351 also includes a spool drum 351c around which probe 353 is wound. A portion of spool 351 forms an advancement wheel 351a that extends upwardly from compartment 320. Accordingly, a clinician can directly rotate spool 351 by applying a force to advancement wheel 351a and such rotation can cause probe 353 to advance or retract.

Figure 4:
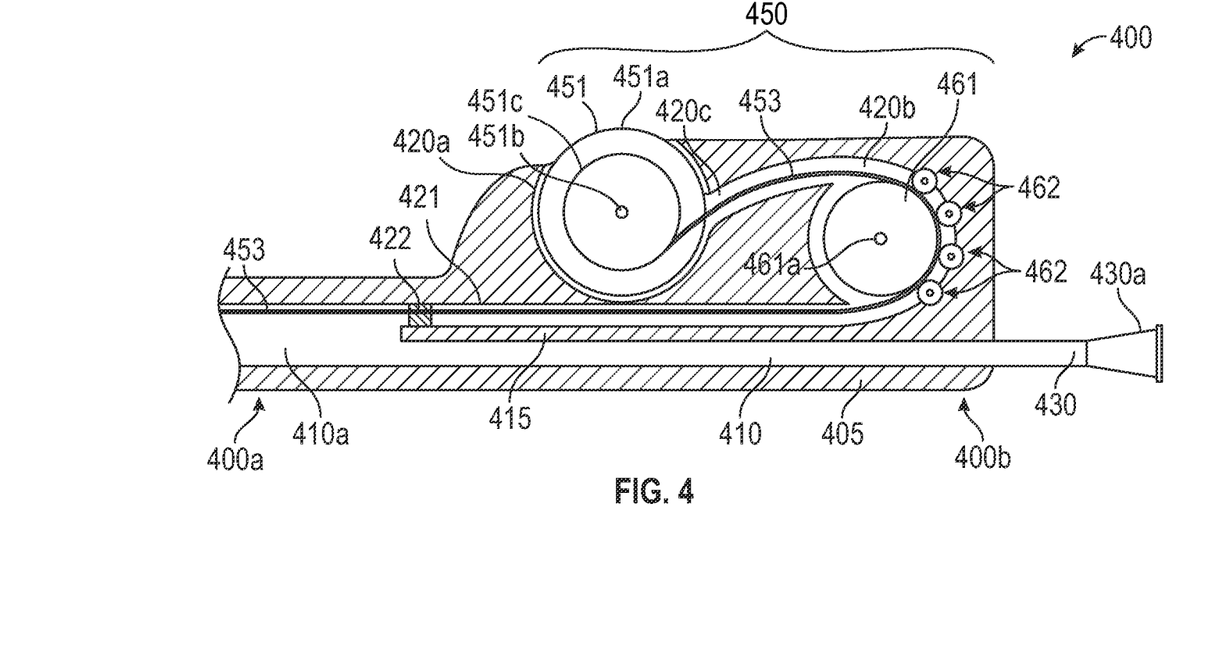
FIG. 4 is a cross-sectional side view of another device that is configured in accordance with some embodiments.

FIG. 4 illustrates another example of a probe delivery device 400 that is configured in accordance with some embodiments of the present disclosure. Probe delivery device 400 includes a housing 405 having a distal end 400a, which may be configured in any manner described above, and a proximal end 400b from which tubing 430 having a connector 430a extends. A fluid pathway 410 extends within probe delivery device 400 from tubing 430 to distal end 400a. Accordingly, a separate device could be coupled to connector 430a to withdraw blood from or inject fluid into fluid pathway 410. In other embodiments, proximal end 400b may form a vacuum tube receiver similar to those described above. In some embodiments, tube 430 may form a portion of fluid pathway 410 (e.g., by extending distally up to the distal end of dividing wall 415).

Probe delivery device 400 includes a probe delivery mechanism 450 that enables a probe 453 to be advanced in a distal direction through an IV catheter and subsequently withdrawn in a proximal direction. A distal compartment 420a and a proximal compartment 420b are formed within probe delivery device 400 and house probe delivery mechanism 450. A compartment channel 420c interconnects distal compartment 420a and proximal compartment 420b. A dividing wall 415 creates a probe channel 421 that extends distally from proximal compartment 420b and joins fluid pathway 410 at a distal portion 410a of fluid pathway 410. A seal 422 may be positioned within and span probe channel 421 to isolate probe channel 421 from fluid pathway 410.

Probe delivery mechanism 450 includes a spool 451 having an axle 451b that maintains spool 451 within distal compartment 420a and allows spool 451 to rotate. Spool 451 also includes a spool drum 451c around which probe 453 is wound. A portion of spool 451 forms an advancement wheel 451a that extends upwardly from distal compartment 420a. Accordingly, a clinician can directly rotate spool 451 by applying a force to advancement wheel 451a.

Probe delivery mechanism 450 also includes a primary wheel 461 having an axle 461a that maintains primary wheel 461 within proximal compartment 420b and allows primary wheel 461 to rotate. Probe delivery mechanism 450 further includes secondary wheels 462 that are adjacent to primary wheel 461 and configured to rotate within proximal compartment 420b. In the depicted embodiment, there are four secondary wheels 462, but, in other embodiments, there may be a single secondary wheel or any other reasonable number of secondary wheels. Also, in some embodiments, probe delivery mechanism 450 may include primary wheel 461 and no secondary wheels.

Probe 453 is wound around spool drum 451c and then extends proximally through compartment channel 420c to wrap around the proximal side of primary wheel 461. Each secondary wheel 462 can be positioned relative to primary wheel 461 to retain probe 453 in close proximity, or even in constant contact with primary wheel 461. Accordingly, the arrangement of primary wheel 461 and secondary wheels 462 may facilitate the advancement of probe 453 by minimizing any resistance that may otherwise be caused as probe wraps around primary wheel 461. More particularly, secondary wheels 462 can hold probe 453 in contact with primary wheel 461 so that, as spool 451 is rotated to advance or retract probe 453, the advancement or retraction will cause primary wheel 461 to rotate in unison. As can be seen, probe delivery mechanism 450 functions in a similar manner as a pulley system and can therefore minimize the amount of force that a clinician may need to apply to spool 451 in order to advance or retract probe 453.

Figure 5:
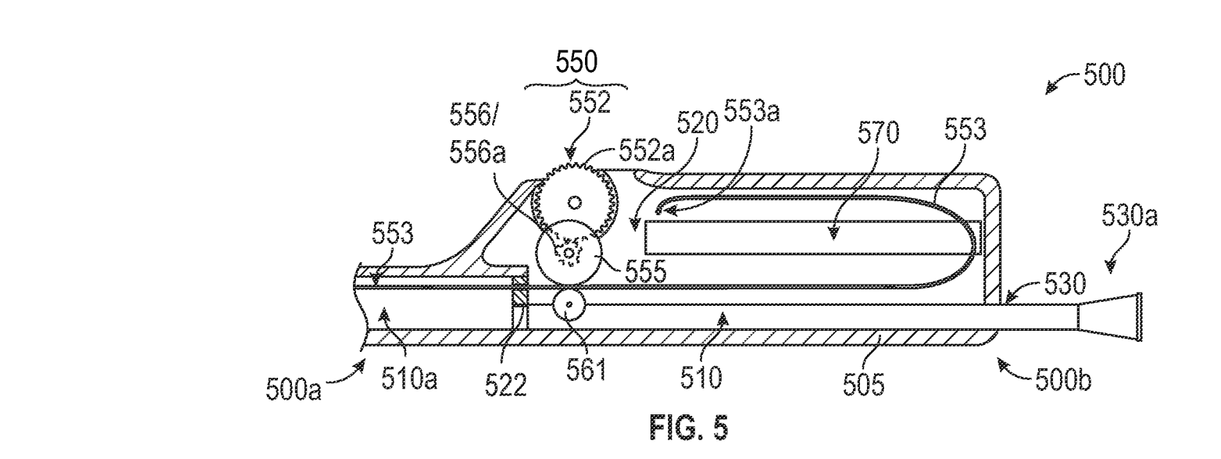
FIG. 5 is a cross-sectional side view of another device that is configured in accordance with some embodiments.

FIG. 5 illustrates another example of a probe delivery device 500 that is configured in accordance with some embodiments of the present disclosure. Probe delivery device 500 includes a housing 505 having a distal end 500a, which may be configured in any manner described above, and a proximal end 500b from which tubing 530 having a connector 530a extends. In the depicted embodiment, tubing 530 forms the proximal portion of a fluid pathway 510 that extends within probe delivery device 500 up to distal portion 510a of fluid pathway 510. Because tubing 530 forms the proximal portion of fluid pathway 510, there is no need for a dividing wall to separate the proximal portion of fluid pathway 510 from compartment 520. However, in other embodiments, a dividing wall could be formed within housing 505 similar to the embodiments described above. In other embodiments, connector 530a could be replaced with a vacuum tube receiver similar to embodiments described above. A seal 522 is positioned within housing 505 to isolate compartment 520 from a distal portion 510a of fluid pathway 510.

Probe delivery device 500 includes a probe delivery mechanism 550 that enables a probe 553 to be advanced in a distal direction through an IV catheter and subsequently withdrawn in a proximal direction. Compartment 520 may be formed as a hollow interior of housing 505. Probe delivery mechanism 550 includes a first guide wheel 555 having a gear 556 with teeth 556a, an advancement wheel 552 having teeth 552a along its outermost edge such that advancement wheel 552 functions as a gear that drives gear 556. Probe delivery mechanism 550 further includes a second guide wheel 561 that is positioned below but adjacent to first guide wheel 555. Probe 553 includes an end 553a that is fixed to a portion of housing 505 (e.g., a portion adjacent to advancement wheel 552). Probe 553 is initially routed in a proximal direction within compartment 520 and then in a distal direction to pass between first guide wheel 555 and second guide wheel 561 and through seal 522.

First guide wheel 555 and second guide wheel 561 can be positioned close together so that probe 553 remains in contact with both guide wheels as probe 553 is advanced or retracted. For example, second guide wheel 561 could be biased against first guide wheel 555. Accordingly, when a clinician rotates advancement wheel 552, the gear formed by advancement wheel 552 will cause first guide wheel 555 to rotate. Because probe 553 is sandwiched between first guide wheel 555 and second guide wheel 561, the rotation of first guide wheel 555 will cause probe 553 to be advanced or retracted depending on the direction of rotation. Second guide wheel 561 can be configured to rotate to minimize any resistance caused as probe 553 is advanced or retracted. In some embodiments, one or both of first guide wheel 555 and second guide wheel 561 can be formed of or coated with a high friction material so that probe 553 will not slide relative to the wheels (i.e., the friction will ensure that the wheels rotate as the probe is advanced or retracted).

In some embodiments, including the depicted embodiment, housing 505 includes a window 570 (e.g., a section of the housing that is transparent) that enables a clinician to see within compartment 520. Window 570 enables the clinician to monitor the distance to which probe 553 has been advanced. For example, a clinician may look through window 570 to see where the curved portion of probe 553 is positioned. When this curved portion is positioned towards proximal end 500b, the clinician can determine that probe 553 is fully retracted. In contrast, when the curved portion is positioned towards the distal end of compartment 520, the clinician can determine that probe 553 is fully advanced. In some embodiments, window 570 or another portion of compartment 520 could include a ruler or other markings that represent the distance to which probe 553 has been advanced when the curved portion of probe 553 aligns with a particular marking. In some embodiments, probe 553 may be colored to increase its visibility within window 570. In some embodiments, the coloring of probe 553 may vary along its length such that the coloring can represent the distance to which probe 553 has been advanced.

Figure 6:
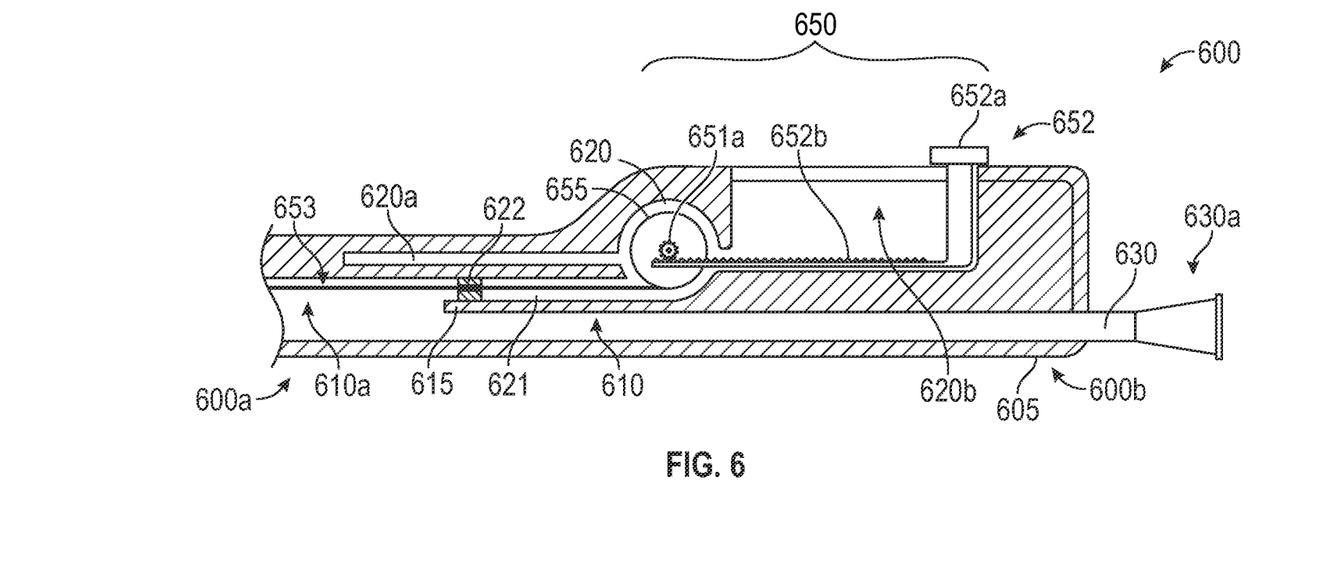
FIG. 6 is a cross-sectional side view of another device that is configured in accordance with some embodiments.

FIG. 6 illustrates another example of a probe delivery device 600 that is configured in accordance with some embodiments of the present disclosure. Probe delivery device 600 includes a housing 605 having a distal end 600a, which may be configured in any manner described above, and a proximal end 600b from which tubing 630 having a connector 630a extends. A fluid pathway 610 extends within probe delivery device 600 from tubing 630 to distal end 600a.

Probe delivery device 600 includes a probe delivery mechanism 650 that enables a probe 653 to be advanced in a distal direction through an IV catheter and subsequently withdrawn in a proximal direction. A compartment 620/620a/620b is formed within probe delivery device 600 and houses probe delivery mechanism 650. A dividing wall 615 creates a probe channel 621 that extends distally from compartment 620 and joins fluid pathway 610 at a distal portion 610a of fluid pathway 610. A seal 622 may be positioned within and span probe channel 621 to isolate probe channel 621 from fluid pathway 610.

Probe delivery mechanism 650 includes a pinion 655 that is configured to rotate within compartment 620. Probe delivery mechanism 650 also includes a rack mechanism 652 having a rack 652b and an actuator portion 652a. Actuator portion 652a extends out from proximal portion 620a of compartment 620 to thereby enable a clinician to use his or her thumb or finger to slide rack mechanism 652 along proximal portion 620b and distal portion 620a of compartment 620. Rack 652b is positioned to interface with pinion 655 so that pinion 655 rotates as rack 652b is slid laterally. Pinion 655 includes a spool drum (not visible) around which probe 653 is wound. This spool drum of pinion 655 can be similar to those described above. Accordingly, as rack mechanism 652 is slid distally, probe 653 will be advanced distally. Likewise, as rack mechanism 652 is slid proximally, probe 653 will be withdrawn proximally. The position of actuator portion 652a can therefore represent the distance to which probe 653 is advanced. In some embodiments, a ruler or other markings may be formed on a portion of housing 605 along which actuator portion 652a slides.

Figure 7:
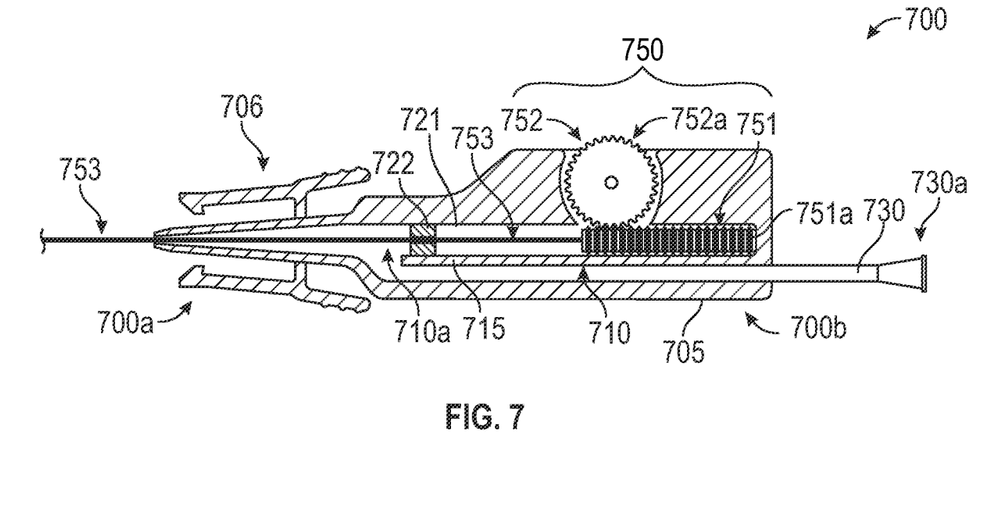
FIG. 7 is a cross-sectional side view of another device that is configured in accordance with some embodiments.

FIG. 7 illustrates another example of a probe delivery device 700 that is configured in accordance with some embodiments of the present disclosure. Probe delivery device 700 includes a housing 705 having a distal end 700a forming a connector 706 and a proximal end 700b from which tubing 730 having a connector 730a extends. A fluid pathway 710 extends within probe delivery device 700 from tubing 730 to distal end 700a.

Probe delivery device 700 includes a probe delivery mechanism 750 that enables a probe 753 to be advanced in a distal direction through an IV catheter and subsequently withdrawn in a proximal direction. A compartment 720 is formed within probe delivery device 700 and houses probe delivery mechanism 750. A dividing wall 715 creates a probe channel 721 that extends distally from compartment 720 and joins fluid pathway 710 at a distal portion 710a of fluid pathway 710. A seal 722 may be positioned within and span probe channel 721 to isolate probe channel 721 from fluid pathway 710.

Probe delivery mechanism 750 includes a shaft 751 that is positioned at a proximal end of probe channel 721 and an advancement wheel 752 that is positioned within compartment 720 and extends out from housing 705. Advancement wheel 752 includes teeth 752a that interface with teeth 751a of shaft 751. Accordingly, when a clinician rotates advancement wheel 752, shaft 751 will be moved linearly within probe channel 721. Probe 753 can be secured within shaft 751 so that, when shaft 751 is moved linearly, probe 753 will advance distally or withdraw proximally depending on the direction of rotation of wheel 752.

Figure 8:
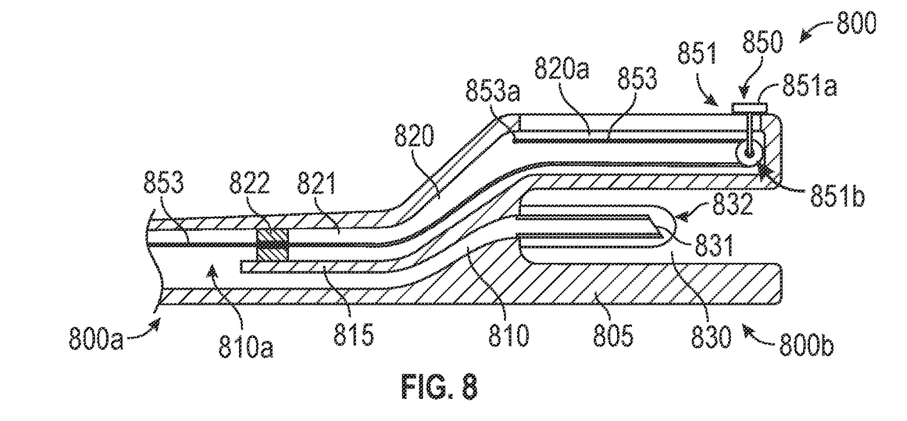
FIG. 8 is a cross-sectional side view of another device that is configured in accordance with some embodiments.

FIG. 8 illustrates another example of a probe delivery device 800 that is configured in accordance with some embodiments of the present disclosure. Probe delivery device 800 includes a housing 805 having a distal end 800a, which may be configured in any manner described above, and a proximal end 800b that forms a vacuum tube receiver 830 having a needle 831 covered by a protective sheath 832. A fluid pathway 810 extends within probe delivery device 800 from needle 831 to distal end 800a.

Probe delivery device 800 includes a probe delivery mechanism 850 that enables a probe 853 to be advanced in a distal direction through an IV catheter and subsequently withdrawn in a proximal direction. A compartment 820 is formed within probe delivery device 800 and houses probe delivery mechanism 850. A dividing wall 815 creates a probe channel 821 that extends distally from compartment 820 and joins fluid pathway 810 at a distal portion 810a of fluid pathway 810. A seal 822 may be positioned within and span probe channel 821 to isolate probe channel 821 from fluid pathway 810.

Probe delivery mechanism 850 includes a sliding member 851 having an actuator portion 851a that extends out from compartment 820 and a wheel 851b that is connected to actuator portion 851a. Compartment 820 can be configured to allow sliding member 851 to slide distally and proximally within compartment 820 when a clinician applies a force to actuator portion 851a. An end 853a of probe 853 can be fixed to housing 805 towards a distal end of compartment 820. Probe 853 is initially routed in a proximal direction around wheel 851b and then in a distal direction through probe channel 821. Wheel 851b can be configured to retain probe 853 in contact with wheel 851b even while sliding member 851 is slid within compartment 820 (e.g., using retaining bars (not shown) that perform a similar function as secondary wheels 462). Accordingly, as sliding member 851 is slid distally, wheel 851b can rotate to thereby advance probe 853 in a distal direction. Because probe 853 is "folded back" on itself, probe 853 will be advanced/retracted twice the distance that sliding member 851 is advanced/retracted.

A number of variations have been described in the context of particular depicted embodiments. It is noted that, even though not explicitly described for each depicted embodiment, such variations may apply to any of the above-described or depicted embodiments. A number of additional variations may also be made as is now described.

In some embodiments, a probe delivery mechanism may include a spring or other mechanism that becomes loaded as the probe is advanced. In such embodiments, the probe delivery mechanism may also include a ratcheting or locking mechanism that prevents the spring from unloading until the clinician releases the ratcheting or locking mechanism (e.g., by pressing a button). Once released, the spring can cause the probe to automatically retract. For example, in the context of FIG. 2, a spring and ratcheting mechanism may be incorporated into spool 251, and a release button may be integrated into housing 205. In such cases, as spool 251 is rotated to advance probe 253, the spring will become loaded. Once the clinician desires to withdraw probe 253, he or she may press the button to release the ratcheting mechanism. The loaded spring will then cause spool 251 to rotate in the reverse direction to cause probe 253 to be wound back around spool drum 251c. Similar techniques could be employed on any of the embodiments that employ a wheel, spool or other rotating member. With regards to probe delivery mechanisms 650 and 850, a linear spring could be loaded as the respective actuator portion is slid distally and unloaded in response to the clinician releasing a ratcheting or other locking mechanism.

In any of described embodiments, the probe delivery device may include some type of indicia representing how far the probe is advanced. Such indicia could be passive (e.g., ruler markings, labels, colors, scales, numbers, symbols, etc.) or active (e.g., a digital display, a speaker, etc.). Also, in any of the described embodiments, the probe delivery mechanism may include mechanisms for preventing over-advancement or over-retraction of the probe. For example, the embodiments that employ rotating components could include stops that contact the rotating components when the probe has reached its maximum advancement distance. As suggested above, although the depicted embodiments show the fluid pathway extending to the proximal end of the probe delivery device, in some embodiments, the fluid pathway could extend out from the probe delivery device at a point other than the proximal end including towards a distal end of the probe delivery device. As an example, fluid pathway 110 could extend out of probe delivery device 100 towards distal portion 110a at a point opposite probe delivery mechanism 150 to form a vacuum tube receiver or other connector.

Figure 9:
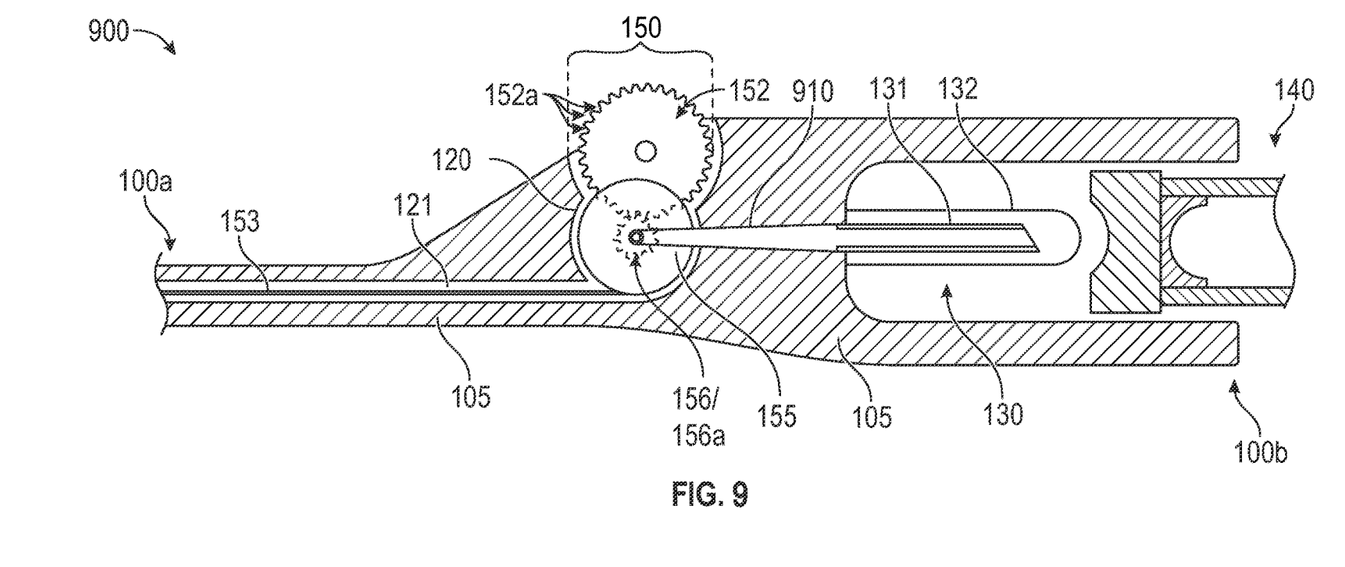
FIG. 9 is a cross-sectional side view of another device that is configured in accordance with some embodiments.

In any of the described embodiments, the fluid pathway and the probe channel may be the same pathway/channel. For example, FIG. 9 illustrates a probe delivery device 900 that resembles probe delivery device 100 except that probe delivery device 900 does not include fluid pathway 110 or seal 122. Instead, probe channel 121 forms the distal portion of the fluid pathway. A proximal portion 910 of the fluid pathway can extend from spool 155 to needle 131 (or any other connector/adapter that may be employed). In such embodiments, probe 153 may be in the form of a tube such that probe 153 forms proximal portion 910 of the fluid pathway. In other words, the proximal end of probe 153 may extend proximally (or in some other direction) from spool 155 to connect to needle 131. In other variations, separate tubing may extend from the probe delivery channel or the compartment that houses the probe delivery mechanism to form the proximal end of the fluid pathway. For example, a separate tube or channel could be formed from compartment 520, 620 or 820 to form a fluid pathway to a vacuum tube receiver or other connector.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed:

1. A probe delivery device, comprising:
   a housing having a proximal end and a distal end, the distal end comprising a connector configured to couple the probe delivery device to an IV catheter device, the housing forming:
      a compartment defined within the housing, at a location between the proximal end and the distal end; and
      a fluid pathway separate from the compartment, the fluid pathway extending from another connector at the proximal end of the housing to the distal end of the housing to transfer a fluid through a length of the housing; and
   a probe delivery mechanism housed in the compartment, the probe delivery mechanism including a probe that extends from the compartment and into the fluid pathway, the probe delivery mechanism being configured to advance the probe in a distal direction and through the distal end of the housing and to retract the probe in a proximal direction;
   wherein the another connector at the proximal end of the housing comprises a vacuum tube receiver having a needle covered by a protective sheath, with the fluid pathway extending from the needle to the distal end of the housing,
   wherein the probe delivery mechanism further comprises:
      a spool around which the probe is wound,
      a primary wheel that is positioned proximal to the spool, wherein the probe extends proximally from the spool, wraps around the primary wheel and then extends into the fluid pathway, and
      one or more secondary wheels that are arranged arcuately around at least a portion of an exterior perimeter of the primary wheel, the probe passing between and contacting the primary wheel and the one or more secondary wheels, wherein the one or more secondary wheels are configured to hold the probe in contact with the primary wheel.

2. The probe delivery device of claim 1, wherein the housing forms a probe channel that extends from the compartment to the fluid pathway, the housing comprising a dividing wall extending distally from the compartment to define the probe channel and separate the compartment from the fluid pathway, with the probe channel offset from and arranged in parallel with the fluid pathway.

3. The probe delivery device of claim 2, further comprising:
   a seal that isolates the probe channel from the fluid pathway, the probe extending through the seal.

4. The probe delivery device of claim 1, wherein the fluid pathway also forms a probe channel through which the probe is advanced.

5. The probe delivery device of claim 1, wherein the probe delivery mechanism comprises a spool and an advancement wheel, wherein the advancement wheel extends out from the housing, and wherein, when the advancement wheel is rotated, the spool rotates to thereby cause the probe to advance or retract.

6. The probe delivery device of claim 5, wherein the probe is wound around a spool drum of the spool.

7. The probe delivery device of claim 5, wherein the advancement wheel and the spool are geared to cause the spool to rotate a different amount relative to an amount of rotation of the advancement wheel.

8. The probe delivery device of claim 1, the spool further comprising an advancement wheel that extends out from the housing.

9. The probe delivery device of claim 1, wherein the probe delivery mechanism comprises a first guide wheel and a second guide wheel, the probe passing between and contacting the first guide wheel and the second guide wheel.

10. The probe delivery device of claim 9, wherein the probe delivery mechanism further comprises an advancement wheel that extends out from the housing, wherein, when the advancement wheel is rotated, the first guide wheel rotates to cause the probe to be advanced or retracted.

11. The probe delivery device of claim 1, wherein the probe delivery mechanism comprises a rack mechanism and a pinion.

12. The probe delivery device of claim 1, wherein the probe delivery mechanism comprises an advancement wheel and a shaft.

13. The probe delivery device of claim 1, wherein the probe delivery mechanism comprises a sliding member having an actuator portion that extends out from the housing and a wheel around which the probe is routed.

14. The probe delivery device of claim 1, wherein the fluid pathway is in fluid communication with a vacuum tube coupled to the vacuum tube receiver and the needle, so as to deliver a flow of the fluid to the vacuum tube, with the compartment isolated from the flow of the fluid.

15. A probe delivery device, comprising:
   an integrally formed, elongated housing having a proximal end and a distal end, the housing forming:
      a compartment defined within the housing, at a location between the proximal end and the distal end; and
      a fluid pathway separate from the compartment, the fluid pathway extending from another connector at the proximal end of the housing to the distal end of the housing to transfer a fluid through a length of the housing, wherein the fluid pathway comprises a proximal end configured to be put in fluid communication with a fluid collection device or a fluid source;
   a connector provided at the distal end of the housing and configured to couple the probe delivery device to an IV catheter device; and
   a probe delivery mechanism housed in the compartment, the probe delivery mechanism including a spool around which a probe is wound such that rotation of the spool causes the probe to be advanced in a distal direction or retracted in a proximal direction, and wherein a distal end of the probe extends into the fluid pathway when advanced,
   wherein the probe delivery mechanism further comprises:

a primary wheel that is positioned proximal to the spool, wherein the probe extends proximally from the spool, wraps around the primary wheel and then extends into the fluid pathway, and one or more secondary wheels that are arranged arcuately around at least a portion of an exterior perimeter of the primary wheel, the probe passing between and contacting the primary wheel and the one or more secondary wheels, wherein the one or more secondary wheels are configured to hold the probe in contact with the primary wheel.

16. The probe delivery device of claim 15, wherein:
the spool extends out from the housing;
the probe delivery mechanism includes an advancement wheel that extends out from the housing and the spool is rotated by the advancement wheel;
the spool is a pinion.

17. A probe delivery device, comprising:
a housing having a proximal end and a distal end and a top surface and a bottom surface, the housing forming:
  a compartment defined within the housing, at a location between the proximal end and the distal end and open to the top surface of the housing;
  a fluid pathway that extends from the proximal end to the distal end to transfer fluid through the housing; and
  a probe channel that is isolated from the fluid pathway, with a dividing wall extending distally from the compartment to separate the compartment from the fluid pathway and define the probe channel;

a connector provided at the distal end of the housing and configured to couple the probe delivery device to an IV catheter device; and a probe delivery mechanism housed in the compartment, the probe delivery mechanism including a probe that extends through the probe channel and into the fluid pathway, the probe delivery mechanism also including an advancement wheel that extends out from the compartment of the housing at the top surface, the advancement wheel actuatable to advance the probe in a distal direction and through the distal end of the housing and to retract the probe in a proximal direction, wherein the probe delivery mechanism further comprises:
  a spool around which the probe is wound,
  a primary wheel that is positioned proximal to the spool, wherein the probe extends proximally from the spool, wraps around the primary wheel and then extends into the fluid pathway, and
  one or more secondary wheels that are arranged arcuately around at least a portion of an exterior perimeter of the primary wheel, the probe passing between and contacting the primary wheel and the one or more secondary wheels, wherein the one or more secondary wheels are configured to hold the probe in contact with the primary wheel.

18. The probe delivery device of claim 17, wherein the probe delivery mechanism extends out from the compartment.

* * * * *

UNITED STATES PATENT AND TRADEMARK OFFICE
CERTIFICATE OF CORRECTION

PATENT NO. : 12,465,724 B2  Page 1 of 1
APPLICATION NO. : 17/195356
DATED : November 11, 2025
INVENTOR(S) : Weston F. Harding et al.

It is certified that error appears in the above-identified patent and that said Letters Patent is hereby corrected as shown below:

In the Claims

Column 14, Line 5, Claim 5, delete "a spool and an" and insert -- an --

Column 15, Line 16, Claim 16, delete "wheel;" and insert -- wheel; or --

Signed and Sealed this
Thirtieth Day of December, 2025

John A. Squires
*Director of the United States Patent and Trademark Office*